Jan. 31, 1928.   1,657,865
G. MERLE, SR
HEAD COVERING FOR FOWLS
Filed Dec. 9, 1926
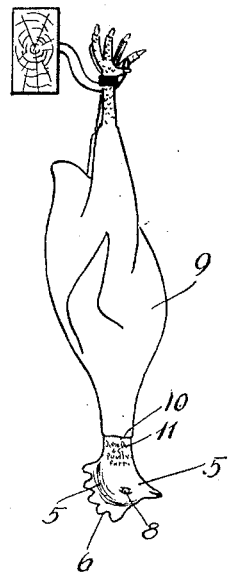
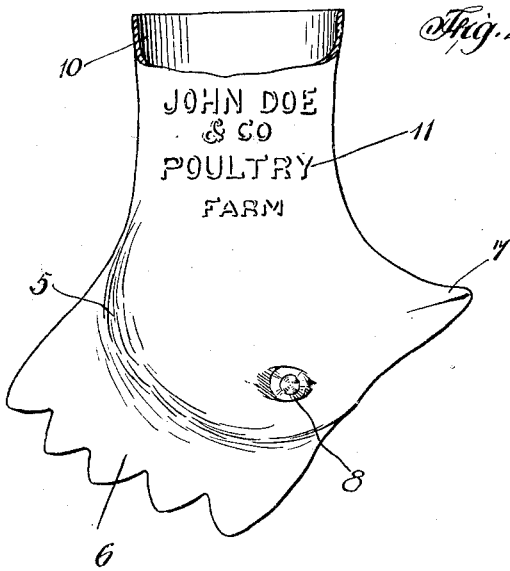
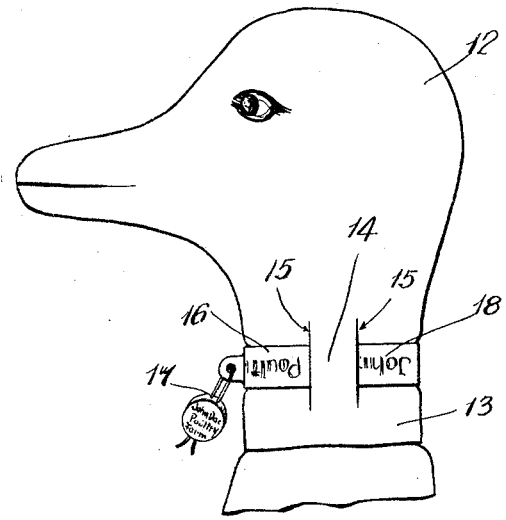
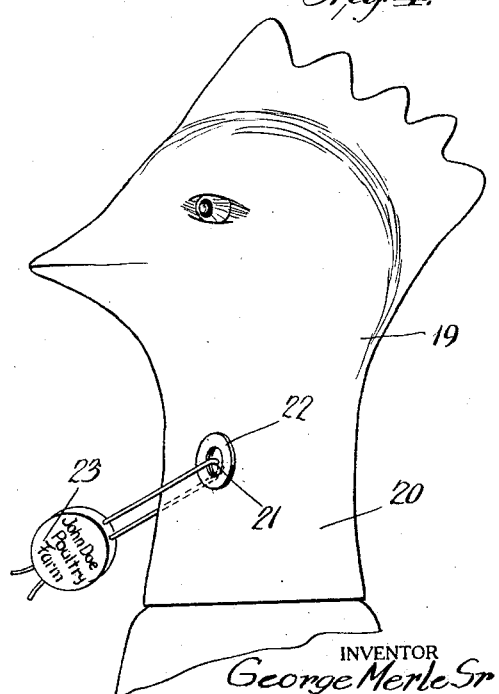
INVENTOR
George Merle Sr
BY
Howard C Thompson
ATTORNEY Patented Jan. 31, 1928.

1,657,865

UNITED STATES PATENT OFFICE.

GEORGE MERLE, SR., OF BROOKLYN, NEW YORK.

HEAD COVERING FOR FOWLS.

Application filed December 9, 1926. Serial No. 153,594.

This invention relates to the merchandising of fowl and similar products, and particularly to the provision of a head covering adapted to be mounted upon the head of a fowl in the shipment of the fowl by a poultry farm or dealer, and in the display of the fowl in the retail stores; and the object of the invention is to provide a head covering enclosing the head and part of the neck portion of a predetermined fowl and preferably in the provision of a head covering shaped and characterized to represent the particular type of fowl in connection with which the covering is used to produce a pleasing and attractive display and sanitary appearance, especially in the display of fowl to the purchaser or consumer; a further object being to provide means for designating the particular producer or poultry farm from which the product placed on sale, originated, to insure to the purchaser or consumer the purchase of merchandise of a given standard controlled by the trade name or trade mark or other name fixed to the product, for example, to the head covering or a part mounted in connection with said head covering, the latter being preferably in the form of a seal or a seal member; and with these and other objects in view, the invention consists in a head covering and method of merchandising fowl, which is simple in construction and which is hereinafter more fully described and claimed.

The invention is fully disclosed in the following specification, of which the accompanying drawing forms a part, in which the separate parts of my improvement are designated by suitable reference characters in each of the views, and in which:—

Fig. 1 is a view illustrating a fowl suspended from a hook when placed on display, and illustrating one form of my improved head covering mounted in connection therewith.

Fig. 2 is a side view of the head covering shown in Fig. 1 on an enlarged scale, and with part of the construction broken away.

Fig. 3 is a detail view of a modified form of head covering and indicating the method of its use; and, Fig. 4 is a view similar to Fig. 3, but showing another modification.

In Figs. 1 and 2 of the drawing, I have shown at 5 a head covering, which in the construction shown, is adapted for use, primarily in connection with poultry, it being understood that the contour or characteristics of the head covering may be such as to adapt its use in connection with fowl of any kind or class. By the word "fowl," I mean any headed animal of the bird class sold as a food product.

In Figs. 1 and 2 of the drawing, the head covering 5 is preferably made of rubber, and the contour is that of a chicken or other fowl having a cone representation 6, a beak 7 and an eye 8. The covering or body 5 is hollow and adapted to receive the head of the fowl 9 as seen in Fig. 1, it being understood that the body 5 is mounted in position by passing the head of the fowl through the opening in the neck portion 10 thereof. It is also preferred that the body or head covering 5 be characterized by printing, lithographing, embossing or any other manner as seen at 11 to designate the producer of the poultry in connection with which the covering is used. The purpose of this identification, which may be in the form of a trade name or trade mark or name of the poultry farm or the like is to insure the purchaser or consumer of obtaining fowl of the standard controlled and governed by said trade name, mark or other identification.

The value of trade marked merchandise and the protection which is afforded thereby, cannot be questioned, but heretofore, in the sale of fowl, no means has been provided for identifying by trade name, trade mark or otherwise, the producer, in order that the purchaser or consumer may be assured of obtaining fowl of a given or well known and extensively advertised standard. One of the distinctive features of my invention consists in the method of merchandising fowl to assure the purchaser or consumer of obtaining the product of a predetermined producer.

In Fig. 3 of the drawing, I have shown a head covering 12 for fowl of the duck class. In this form of construction, the covering is of a contour to represent generally the character of the fowl, it being understood that the covering may be made of any suitable material, but preferably elastic material.

In the construction shown, the neck portion 13 of the covering or body 12 is provided with one or more strap portions 14, formed by severing the neck portion 13 in spaced parallel slits 15, and a metallic or other band 16 is passed beneath the strap or straps 14 and through the slits 15 and extends around the neck externally of the body 12. The ends of said band are sealed together as seen at 17 to prevent the displacement of the band as well as the covering, from the head of the fowl. It will be understood that the diameter of the band 16 will be smaller than the dimensions of the head. Thus, the band can only be removed by severing the head from the fowl or by breaking the seal of said band. In this form of construction, the trade name, trade mark or other designating characteristics or symbols 18 are applied to the band 16. However, my invention is not limited to this application, as the mark may be applied to the head covering as in Figs. 1 and 2 of the drawing. It will also be understood that any type of sealing device or member may be employed, and when the head cover 12 is used, it is preferred that the sealing means or member be coupled with said covering.

In Fig. 4 of the drawing, I have shown another modification wherein a head covering 19, substantially similar to that shown in Fig. 1 of the drawing, is employed. The neck portion 20 of this head covering is provided at opposite sides with openings 21 preferably reinforced as seen at 22. In securing the head covering to the fowl, a wire or rod is passed through the openings 21, and through the neck of the fowl. The ends of the wires are sealed together by a sealed body 23, to which the trade name, mark or other symbol may be applied. In this form of construction, it will also be apparent that the mark or symbol may be applied to the head cover 19, and the head covering and seal can only be removed by severing the head of the fowl.

It will be understood that my improved head covering is not necessarily made to fit snugly upon the head of the different fowl, nor is it absolutely essential that the covering be of a contour to simulate the natural head of the fowl, nor is my invention necessarily limited to the use of head coverings composed of flexible or elastic material. Various other changes in and modifications of the construction herein shown and described, may be made within the scope of the appended claims, without departing from the spirit of my invention or sacrificing its advantages.

Having fully described my invention, what I claim as new and desire to secure by Letters Patent, is:—

1. A head covering for fowl comprising a body characterized to represent the contour of the head of a predetermined fowl and adapted to be mounted on the head of the fowl.

2. A head covering for fowl comprising a body characterized to represent the contour of the head of a predetermined fowl and adapted to be mounted on the head of the fowl, and a seal device cooperating with said head covering.

3. A head covering for fowl comprising a body characterized to represent the contour of the head of a predetermined fowl, and adapted to be mounted on the head of the fowl, and a seal device passing through said covering and engaging the fowl adjacent the head to prevent displacement of the covering from the head of the fowl.

4. A head covering for fowl comprising a body characterized to represent the contour of the head of a predetermined fowl, and adapted to be mounted on the head of the fowl, and a seal device passing through said covering and engaging the fowl adjacent the head to prevent displacement of the covering from the head of the fowl, said seal device involving a band encircling the neck of the fowl.

5. In an article of manufacture for use in merchandising fowl, an element involving a head covering adapted to be mounted upon the head of the fowl, and a member sealed to said covering and engaging said fowl for sealing said head covering against displacement from the fowl.

6. In an article of manufacture for use in merchandising fowl, an element involving a head covering adapted to be mounted upon the head of the fowl, a member sealed to with said covering and engaging said fowl for sealing said head covering against displacement from the fowl, and said head covering being shaped to represent a predetermined type of fowl.

In testimony that I claim the foregoing as my invention I have signed my name this 7th day of December 1926.

GEORGE MERLE, Sr.